Dec. 2, 1969  L. A. MAZEROLLE  3,481,652
ADVERTISING MEANS
Filed April 21, 1967  2 Sheets-Sheet 1
FIG. 1.
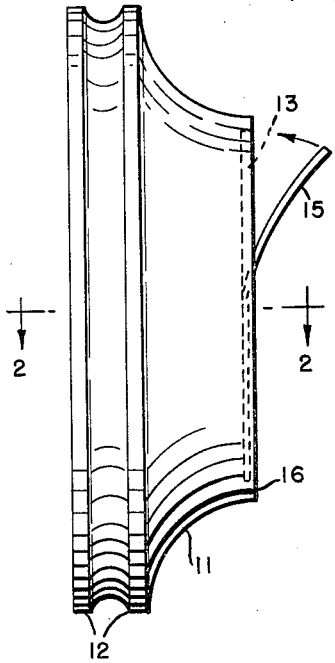
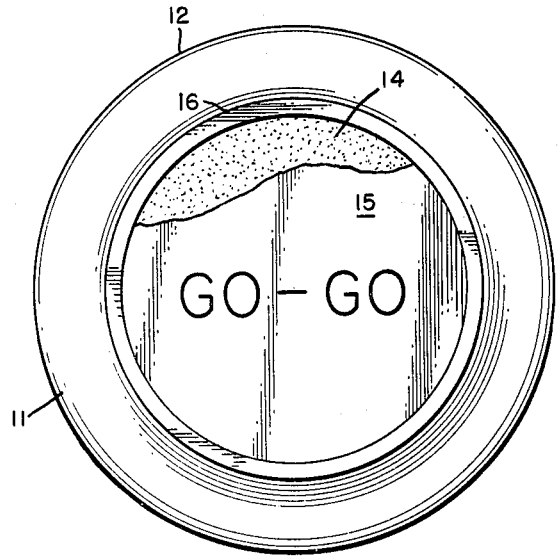
FIG. 3.
FIG. 2.
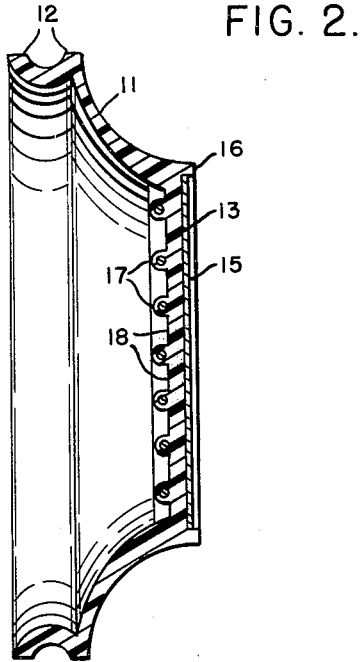
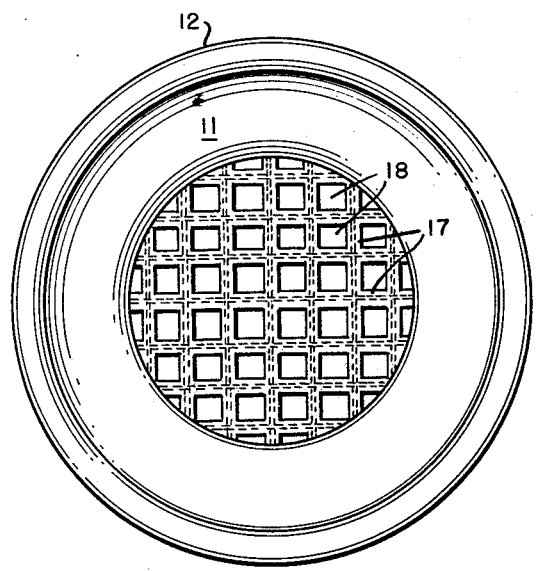
FIG. 4.
INVENTOR
LORN A. MAZEROLLE
BY *Albert J. Kramer*
ATTORNEY

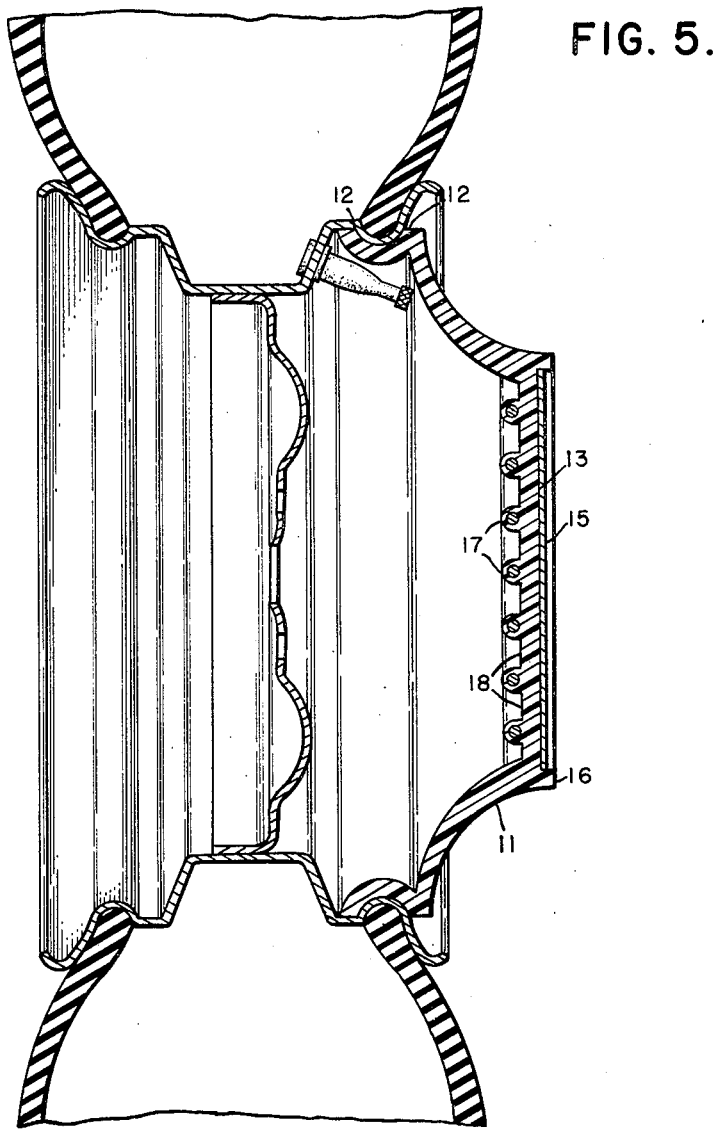

United States Patent Office 3,481,652
Patented Dec. 2, 1969

3,481,652
ADVERTISING MEANS
Lorn A. Mazerolle, P.O. Box 7551,
Jacksonville, Fla. 32210
Filed Apr. 21, 1967, Ser. No. 632,774
Int. Cl. B60b 7/06; G09f 7/12
U.S. Cl. 301—37
3 Claims

ABSTRACT OF THE DISCLOSURE

As an advertising medium, an automobile hub cap is provided of a high impact plastic material with a central flat section that exposes an area for attachment by adhesive means, of advertising stickers. An edging is provided surrounding the area to act as a protector against accidental contact with objects which might otherwise cause mutilation or separation of the stickers.

---

This invention relates to advertising and it is more particularly concerned with the provision of means for exposing to the public view various advertisements in an attractive manner.

An object of the invention is the provision of an advertising medium in a modfied form of hub cap of an automobile.

Another object is the provision of such an advertising medium which can be used over and over again by simply substituting one advertising sticker for another.

A further object is the provision of means for potecting the advertising sticker against accidental removal or loosening.

A still further object is the provision of a hub cap advertising device which is relatively inexpensive.

These and still further objects, advantages and features of the invention will be apparent from the following description considered together with the accompanying drawing.

In the drawing:
FIG. 1 is a front elevational view of an embodiment of the invention showing an advertising sticker partly in place.
FIG. 2 is a sectional view along the line 2—2 of FIG. 1.
FIG. 3 is a front elevational view of the embodiment.
FIG. 4 is a rear elevational view of the embodiment.
FIG. 5 is a view similar to FIG. 2 showing the embodiment attached to a conventional rim wheel.

Referring to the drawing with more particularity, the embodiment illustrated comprises a one piece automobile hub cap 11 having a conventional outer lip configuration 12 which adapts it for attachment to an automobile wheel in the conventional manner.

A central section 13 of the hub cap is made generally flat. The outside surface 14 is roughened to present a glueable area for a piece of canvas 15. An integral continuous edging 16 is provided about the surface 14 sufficient to conceal and protect the outer edges of the canvas piece 15.

The entire hub cap is of a high impact resistant plastic material, such as polyethylene. However, to minimize deformation of the central section 13 there are provided integral ribs 17 across the inside surface 18.

By providing the embodiment in the form of a one piece plastic material the cost is substantially reduced in comparison with the cost of ordinary automobile hub caps made of metal.

The canvas piece 15 is made to the exact dimension of the surface 14 within the edging 16 and carries on its outer side 19 a design slogan or other mark or display desired to be advertised. Alternatively, the piece 15 may be of a plastic sheet material or of weather resistant coated paper or of other suitable sheet material. Such sheet materials may be precoated on the inner side with an adhesive 20 protected in a conventional manner by a cover sheet (not shown) and applied after removing the cover sheet.

The edging 16 acts to shield the edges of the piece 15 from accidental contact with objects which might otherwise cause separation from the surface 14.

I claim:
1. A one piece automobile hub cap of a plastic material, said hub cap having an outer annular lip configuration for attachment of the hub cap to an automobile wheel, said hub cap having a gradually reduced portion extending outwardly from the annular lip and formed by an annular continuous concave curvature between the lip and the portion, said portion comprising a central flat section having a flat outer side, a flexible display sheet on said flat outer side substantially coextensive therewith, an edging surrounding and delineating said flat outer side, said edging extending outwardly a distance greater than the thickness of the display sheet, means adhesively securing the display sheet to said flat outer side, and transverse ribs integrally disposed in criss-cross relation along the inner side of the central flat section to minimize deformation of the section.

2. A one piece automobile hub cap as defined by claim 1 in which the central flat area has a roughened surface for the application of an adhesive substance between it and the sheet of display material.

3. A one piece automobile hub cap as defined by claim 1 in which the material is polyethylene.

References Cited

UNITED STATES PATENTS

| | | | |
|---|---|---|---|
| 2,591,779 | 4/1952 | Buck | 40—125 X |
| 2,973,226 | 2/1961 | Ellies | 301—37 |
| 2,978,277 | 4/1961 | Gaudry | 301—111 |
| 3,220,776 | 11/1965 | Golden | 301—108 |
| 3,333,900 | 8/1967 | Aske | 301—37 |
| 2,433,854 | 1/1948 | Lyon | 301—37 |
| 492,436 | 2/1893 | Ryder | 301—108 |
| 2,640,730 | 6/1953 | Lyon | 301—37 |
| 2,902,316 | 9/1959 | Black | 301—37 |
| 2,994,979 | 8/1961 | Shoemaker | 301—37 X |

RICHARD J. JOHNSON, Primary Examiner

U.S. Cl. X.R.

40—129